United States Patent
Enomoto et al.

(10) Patent No.: US 10,505,770 B2
(45) Date of Patent: Dec. 10, 2019

(54) RECEPTION SIGNAL PROCESSING DEVICE, RADAR, AND OBJECT DETECTION METHOD

(71) Applicants: FUJITSU TEN LIMITED, Kobe-shi, Hyogo (JP); ASAHI KASEI MICRODEVICES CORPORATION, Tokyo (JP); DENSO CORPORATION, Kariya-shi, Aichi-ken (JP)

(72) Inventors: Daisuke Enomoto, Kobe (JP); Kazuhiro Komatsu, Kobe (JP); Kenta Iwai, Kobe (JP); Takeshi Tanaka, Kobe (JP); Minoru Uehara, Kobe (JP); Tsuyoshi Sakakibara, Tokyo (JP); Naoto Kusakawa, Tokyo (JP); Hideki Kitagawa, Nukata-gun (JP)

(73) Assignees: FUJITSU TEN LIMITED, Kobe (JP); ASAHI KASEI MICRODEVICES CORPORATION, Tokyo (JP); DENSO CORPORATION, Kariya (JP)

(*) Notice: Subject to any disclaimer, the term of this patent is extended or adjusted under 35 U.S.C. 154(b) by 725 days.

(21) Appl. No.: 14/823,730

(22) Filed: Aug. 11, 2015

(65) Prior Publication Data
US 2016/0061943 A1 Mar. 3, 2016

(30) Foreign Application Priority Data
Aug. 26, 2014 (JP) ................. 2014-171931

(51) Int. Cl.
*H04L 27/08* (2006.01)
*G01S 13/93* (2006.01)
(Continued)

(52) U.S. Cl.
CPC ............ *H04L 27/08* (2013.01); *G01S 7/4021* (2013.01); *G01S 13/345* (2013.01); *G01S 13/931* (2013.01);
(Continued)

(58) Field of Classification Search
CPC ..................................... G01S 7/4021
(Continued)

(56) References Cited

U.S. PATENT DOCUMENTS

| 4,075,573 A * | 2/1978 | Kennedy ................... G01S 7/34 330/129 |
| 5,412,414 A * | 5/1995 | Ast ...................... G01S 7/4017 342/174 |

(Continued)

FOREIGN PATENT DOCUMENTS

| JP | H10-10227 A | 1/1998 |
| JP | 2011-127910 A | 6/2011 |
| JP | 2012-198070 A | 10/2012 |
| WO | 2013/164456 A1 | 11/2013 |

*Primary Examiner* — Peter M Bythrow
*Assistant Examiner* — Helena H Seraydaryan
(74) *Attorney, Agent, or Firm* — Oliff PLC (57) ABSTRACT

A signal processing device according to an embodiment includes a plurality of signal processing units and a pseudo signal generating unit. The plurality of signal processing units are provided in a plurality of reception antennas which receive reflection signals of a transmission signal reflected on an object, and perform signal processing in parallel on beat signals which are generated based on the transmission signal and the reflections signals. The pseudo signal generating unit generates a pseudo signal imitating the beat signal, and inputs the pseudo signal as a target of the signal processing into the plurality of signal processing units in parallel.

14 Claims, 7 Drawing Sheets

(51) Int. Cl.
  *G01S 7/40*    (2006.01)
  *G01S 13/34*   (2006.01)
  *H04B 1/16*    (2006.01)
  *H04B 1/12*    (2006.01)
  *G01S 13/42*   (2006.01)

(52) U.S. Cl.
  CPC .............. *H04B 1/123* (2013.01); *H04B 1/16* (2013.01); *G01S 13/42* (2013.01); *G01S 2007/4073* (2013.01)

(58) Field of Classification Search
  USPC ........................................................ 342/127
  See application file for complete search history.

(56) References Cited

U.S. PATENT DOCUMENTS

| | | | | |
|---|---|---|---|---|
| 5,757,307 | A * | 5/1998 | Nakatani | ................ G01S 13/42 342/107 |
| 6,100,841 | A * | 8/2000 | Toth | ...................... G01S 7/4021 342/149 |
| 2007/0080835 | A1* | 4/2007 | Maeda | ................... H03D 3/009 341/120 |
| 2012/0088464 | A1* | 4/2012 | Dehlink | ................ G01S 7/4021 455/255 |
| 2012/0122485 | A1* | 5/2012 | Bartlett | ................ G01S 5/0284 455/456.1 |

* cited by examiner

RECEPTION SIGNAL PROCESSING DEVICE, RADAR, AND OBJECT DETECTION METHOD

CROSS-REFERENCE TO RELATED APPLICATION

This application is based upon and claims the benefit of priority of the prior Japanese Patent Application No. 2014-171931, filed on Aug. 26, 2014, the entire contents of which are incorporated herein by reference.

FIELD

The embodiment discussed herein is related to a reception signal processing device, a radar, and an object detection method.

BACKGROUND

Conventionally, there is disclosed a radar which receives a reflection signal of a transmission signal reflected on an object using one reception antenna and detects a distance up to the object and a relative velocity with respect to the object based on the transmission signal and the received reflection signal (for example, see Japanese Laid-open Patent Publication No. 2012-198070). In addition, there is disclosed a radar which receives the reflection signal from the object using a plurality of reception antennas and improves the detection accuracy of the object by detecting the object using the plurality of received reflection signals.

The radar having the plurality of reception antennas mixes the reflection signals received by the reception antennas and the transmission signal to generate a plurality of beat signals, performs a predetermined signal processing on each beat signal, and then converts the analog beat signal into a digital beat signal. Then, the radar performs the fast Fourier transform on the digital beat signal, and detects the distance up to the object and the relative velocity with respect to the object by analysis on the frequency of the converted signal.

The radar includes a plurality of signal processing units which perform a predetermined signal processing on the plurality of beat signals in parallel. Each signal processing unit is designed not to cause a variation in characteristics to the upmost, but the variation is caused in some cases. In such a case, the radar generates a relative phase error between the beat signals after the signal processing of each signal processing unit, and makes the detection accuracy of the object lowered.

As a method of suppressing the reduction of the detection accuracy as described above, for example, there is a method in which a test for detection of the object is performed on the object placed at a position away from the radar by a predetermined distance, and a relative phase error value is calculated from detection data and used as a correction value of the beat signal.

However, the distance to a detectable object is extended. Thus, it is difficult for recent radars to perform the test for the detection of the object at a maximum detectable position in a limited manufacturing space. Therefore, the detection accuracy of the object at a remote place may be reduced.

SUMMARY

According to an aspect of an embodiment, a reception signal processing device includes a plurality of signal processing units and a pseudo signal generating unit. The plurality of signal processing units are provided in a plurality of reception antennas which receive reflection signals of a transmission signal reflected on an object, and perform signal processing in parallel on beat signals which are generated based on the transmission signal and the reflections signals. The pseudo signal generating unit generates a pseudo signal imitating the beat signal, and inputs the pseudo signal as a target of the signal processing into the plurality of signal processing units in parallel.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Hereinafter, embodiment of a reception signal processing device, a radar, and an object detection method according to the present application will be described in detail with reference to the accompanying drawings. Further, the invention is not limited to the following embodiment.

Herein, the description will be made about an example of a radar 1 that is mounted in a vehicle 100 and detects an object (for example, another vehicle, a pedestrian, etc.) in front of the vehicle 100, and the radar 1 may be mounted in any other apparatus besides the vehicle 100.

Figure 1:
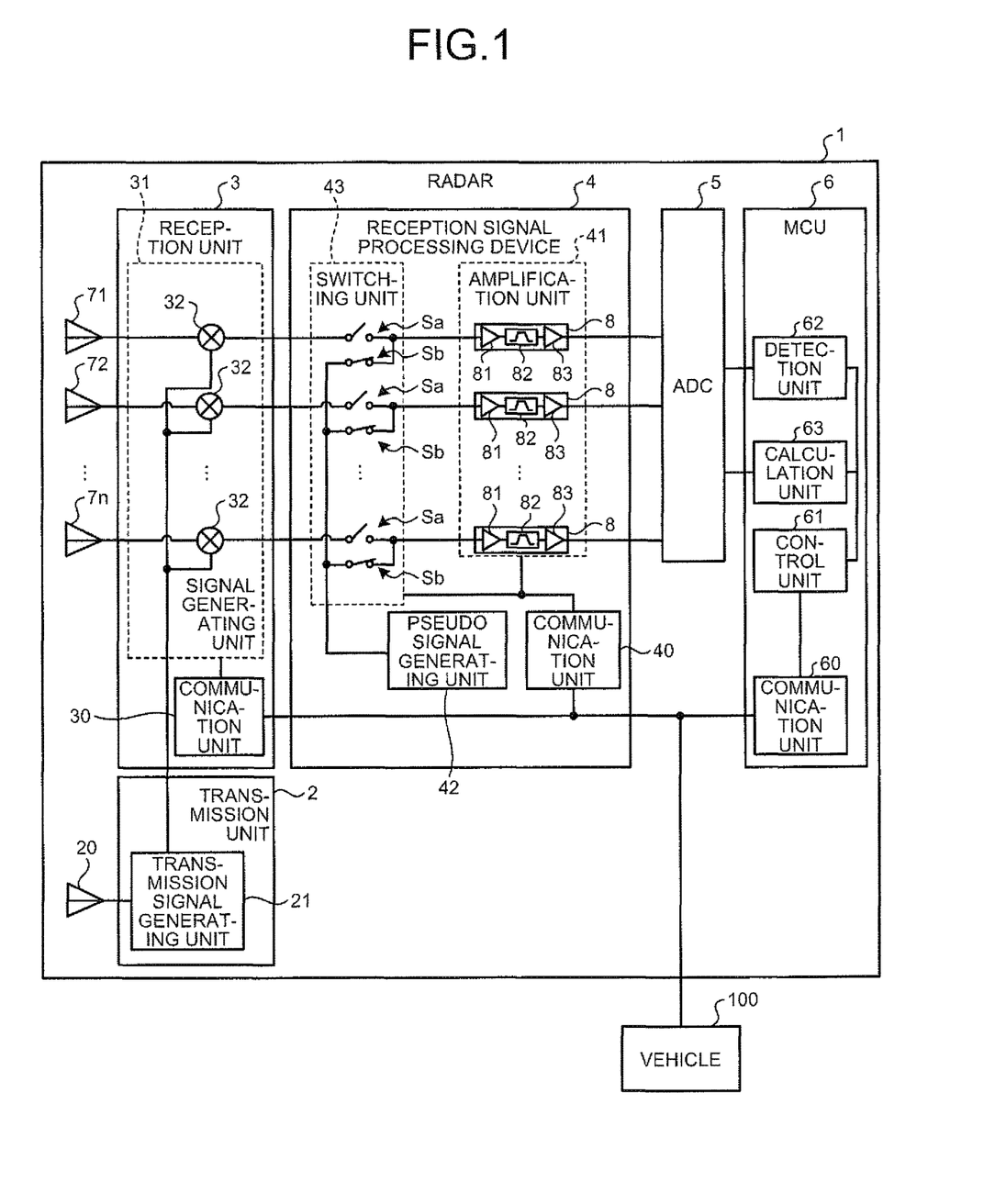
FIG. 1 is a diagram for describing a radar according to an embodiment.

FIG. 1 is a diagram for describing the radar 1 according to an embodiment. As illustrated in FIG. 1, the radar 1 includes a transmission unit 2, a reception unit 3, a reception signal processing device 4, an analog-digital converter (ADC) 5, and a micro control unit (MCU) 6.

The transmission unit 2 includes a transmission antenna 20 and a transmission signal generating unit 21. The transmission signal generating unit 21 generates a transmission signal, and transmits the transmission signal toward a detection area of the object from the transmission antenna 20. The transmission signal is, for example, a signal modulated using a triangular wave in which frequency and time are linearly increased and decreased. The subject transmission unit 2 transmits, for example, a transmission signal of which the frequency is several GHz. In addition, the transmission signal generating unit 21 outputs the generated transmission signal to the reception unit 3.

The reception unit 3 includes a plurality (herein, n pieces) of reception antennas 71 to 7n. Further, n is a natural number of 3 or more. The reception antennas 71 to 7n are antennas for receiving reflection signals of the transmission signal reflected on the object.

In the following, a signal processing system of each of the reception antennas 71 to 7n is referred to as a channel, in which the signal processing system of the reflection signal received by the reception antenna 71 is referred to as a first channel, the signal processing system of the reflection signal received by a reception antenna 72 is referred to as a second channel, and so on. The radar 1 includes n channels from the first channel to an n-th channel.

In addition, the reception unit 3 includes a communication unit 30 and a signal generating unit 31. The communication unit 30 receives a control signal related to a reception operation of the reception unit 3 from the MCU 6. The signal generating unit 31 includes n beat signal generating units 32, each of which is provided for each channel. Each beat signal generating unit 32 is a mixer which is connected to the corresponding one antenna among the reception antennas 71 to 7n, the transmission signal generating unit 21, and the reception signal processing device 4.

Each beat signal generating unit 32 generates a beat signal which is obtained by mixing the reflection signal input from the corresponding one antenna among the reception antennas 71 to 7n and the transmission signal input from the transmission signal generating unit 21 and has a frequency difference (a beat frequency) between the reflection signal and the transmission signal. Then, each beat signal generating unit 32 outputs the generated beat signal to the reception signal processing device 4.

The reception signal processing device 4 includes a communication unit 40, an amplification unit 41, a pseudo signal generating unit 42, and a switching unit 43. The communication unit 40 receives a control signal related to a signal processing operation of the reception signal processing device 4 from the MCU 6.

The amplification unit 41 includes n signal processing units 8 provided for each channel. The signal processing units 8 each perform a predetermined signal processing in parallel on the input signals, and output the signals subjected to the signal processing toward the ADC 5. Specifically, each signal processing unit 8 includes a variable gain amplifier 81, a filter 82, and an amplifier 83, which are connected in series.

The variable gain amplifier 81 performs an automatic adjustment such that a signal to be output from the signal processing unit 8 has a predetermined constant amplitude regardless of an amplitude of a signal to be input, and amplifies the input signal to be output toward the filter 82.

The filter 82 removes unnecessary frequency components from the input signal out of the variable gain amplifier 81 and outputs the signal toward the amplifier 83. The amplifier 83 amplifies the signal input from the filter 82 and outputs the signal toward the ADC 5.

The pseudo signal generating unit 42 generates a pseudo signal imitating the beat signal generated by the reception unit 3, and outputs the pseudo signal to each signal processing unit 8 through the switching unit 43. The effects obtained by providing the pseudo signal generating unit 42 will be described below after the entire configuration and an object detecting operation of the radar 1 are described.

The switching unit 43 includes, for each channel, a first switch Sa which switches the connection and the discon-nection between the beat signal generating unit 32 and the signal processing unit 8, and a second switch Sb which switches the connection and the disconnection between the pseudo signal generating unit 42 and the signal processing unit 8.

In a case where an object is detected by the radar 1, the switching unit 43 is operated according to a control signal input from the MCU 6, and each first switch Sa is turned on and each second switch Sb is turned off. With this operation, the beat signal is input in parallel toward each signal processing unit 8 corresponding to each beat signal generating unit 32.

In addition, in a case where it is an error calculation timing (to be described below), the switching unit 43 is operated such that each first switch Sa is turned off and each second switch Sb is turned on. With this operation, the pseudo signal is input in parallel toward each signal processing unit 8 from the pseudo signal generating unit 42. The ADC 5 is a processing unit which converts an analog signal input from each signal processing unit 8 into a digital signal (hereinafter, referred to as "AD conversion") and outputs the digital signal to the MCU 6.

The MCU 6 includes, for example, a central processing unit (CPU), a read only memory (ROM), and a random access memory (RAM). The MCU 6 includes a communication unit 60, a control unit 61 which is operated by the CPU executing a program read out of the ROM using the RAM as a work area, a detection unit 62, and a calculation unit 63.

The control unit 61 is a processing unit which controls the entire operation of the radar 1. The communication unit 60 outputs a control signal input from the control unit 61 to the reception unit 3 and the reception signal processing device 4. The detection unit 62 is a processing unit which detects an object based on the AD-converted beat signal input from the ADC 5.

Specifically, the detection unit 62 converts the beat signal in a time domain into the beat signal in a frequency domain by making the input beat signal subjected to a fast Fourier transform (hereinafter, referred to as "FFT").

As described above, the beat signal generated by the reception unit 3 contains the frequency difference (the beat frequency) between the reflection signal and the transmission signal. Therefore, the FFT-converted beat signal also contains the beat frequency.

The frequency of the reflection signal is changed according to the frequency of the transmission signal by an influence of a time delay $\Delta T$ according to a relative distance R between the radar 1 and the object, and a Doppler shift $\Delta D$ according to a relative velocity V between the radar 1 and the object, so that the frequency difference (the beat frequency) is made.

The detection unit 62 performs the frequency spectrum analysis on the FFT-converted beat signal containing the beat frequency to acquire a beat frequency fu in a frequency increasing section and a beat frequency fd in a frequency decreasing section of the transmission signal and the reflection signal. Then, the detection unit 62 calculates the relative distance R to the object and the relative velocity V to the object based on the acquired beat frequencies fu and fd and the following equations (1) and (2), and performs the detection of the object.

$$\text{Relative distance } R = C(fu+fd)/(8\Delta F \cdot fm) \quad (1)$$

$$\text{Relative velocity } V = C(fu-fd)/(4fc) \quad (2)$$

Herein, C represents the speed of light, fm represents a frequency of a triangular modulation, ΔF represents a frequency modulation width of the transmission signal, and fc represents a carrier frequency of the transmission signal.

The calculation unit 63 is a processing unit which calculates a relative phase error value between the beat signals input from the respective signal processing units 8. Herein, the effects obtained by providing the pseudo signal generating unit 42 in the reception signal processing device 4 and the operation of the calculation unit 63 will be described.

In the radar 1, when the signal processing units 8 have the same characteristics, in a case where the same beat signal is input to the signal processing unit 8, the amplified beat signal equal in phase is output from each signal processing unit 8. However, when there is a variation in the characteristics of the signal processing units 8, in a case where the same beat signal is input to the signal processing units 8, there occurs a relative phase error between the amplified beat signals output from the signal processing units 8.

The relative phase error causes the following factors to make the detection accuracy of the object lowered in the radar 1. Therefore, there is a need for the radar 1 to detect the object in consideration of the relative phase error between the amplified beat signals input from the signal processing units 8.

In addition, the relative phase error is different in the frequency of the beat signal according to a distance between the radar 1 and the detected object. Specifically, the relative phase error is significantly different between a case where the object is at a position relatively near the radar 1 by several meters and a case where the object is at a remote position from the radar 1 by 1 to 100 m or so. Further, when the distance from the radar 1 to the object is, for example, 50 m or less, the relative phase error is substantially constant regardless of the distance to the object.

Therefore, regarding the relative phase error in a case where the object is at a relatively near position, a test for detecting an object at a relatively near position is performed during a manufacturing procedure, and the relative phase error value calculated from the detection data acquired in the test is stored in the radar 1.

However, regarding the relative phase error in a case where the object is at a relatively remote position of 1 to 100 m or so from the radar 1, the above test is hardly performed in a limited manufacturing space, so that the relative phase error value is not able to be acquired.

Therefore, the reception signal processing device 4 in the radar 1 includes the pseudo signal generating unit 42. For example, the pseudo signal generating unit 42 generates a pseudo signal imitating the beat signal of about several MHz generated by the reception unit 3 on assumption that the reflection signal is received from the object at a remote position away from the radar 1 by 1 to 100 m or so.

Then, in the radar 1, in a case where it is a predetermined error calculation timing, the pseudo signal is input in parallel from the pseudo signal generating unit 42 to the respective signal processing units 8 by making the control unit 61 turn off the first switches Sa of the switching unit 43, and turn on the second switches Sb.

Figure 2:
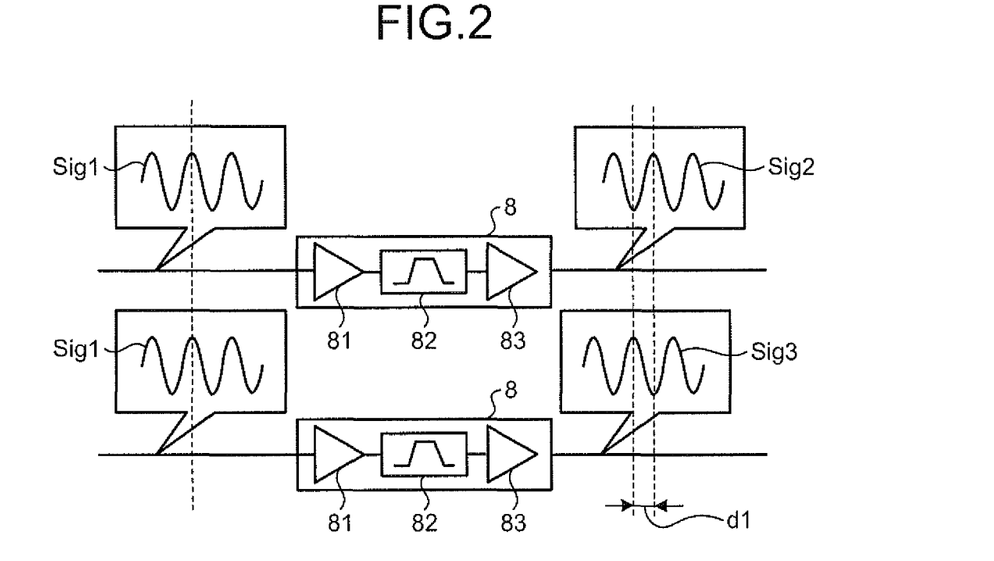
FIG. 2 is a diagram for describing a pseudo signal before and after signal processing according to the embodiment.

The signal processing unit 8 performs the signal processing in parallel on the input pseudo signal, and outputs the pseudo signal after the signal processing to the ADC 5. Herein, the pseudo signal before and after the signal processing will be described with reference to FIG. 2. FIG. 2 is a diagram for describing the pseudo signal before and after the signal processing according to the embodiment.

As illustrated in FIG. 2, in the radar 1, in a case where it is a predetermined error calculation timing, the same pseudo signal Sig1 is input to each signal processing unit 8. Therefore, of course, there is no relative phase error between the pseudo signals Sig1 input to the signal processing units 8.

Then, in a case where there is a variation in the characteristics between the signal processing units 8, the pseudo signal Sig1 is delayed at a stage of amplifying the pseudo signal by the variable gain amplifier 81, a stage of removing unnecessary frequency components from the pseudo signal by the filter 82, and a stage of amplifying the pseudo signal by the amplifier 83.

Therefore, for example, as illustrated in FIG. 2, there occurs a relative phase error d1 between a pseudo signal Sig2 output from the signal processing unit 8 of the first channel after the signal processing and a pseudo signal Sig3 output from the signal processing unit 8 of the second channel after the signal processing.

In this way, in the radar 1, a situation in a case where the object is detected in a state where the object is remotely disposed away from by about 100 m is reproduced, the pseudo signals Sig2 and Sig3 generated by the relative phase error after the signal processing are input from the signal processing units 8 to the ADC 5.

The ADC 5 performs the AD conversion on the pseudo signals Sig2 and Sig3 and outputs the digital signals to the calculation unit 63 of the MCU 6. The calculation unit 63 performs the FFT on the input pseudo signals so as to convert the pseudo signals in a time domain into the pseudo signal in a frequency domain.

Thereafter, the calculation unit 63 performs the frequency spectrum analysis on the FFT-converted pseudo signals containing the beat frequency to acquire the beat frequencies fu and fd. Then, the detection unit 62 calculates the relative phase error value from the beat frequencies fu and fd between the pseudo signals and stores the value.

In a case where an object away from by about 100 m is detected, the detection unit 62 uses the relative phase error value calculated and stored by the calculation unit 63 as a correction value of the beat signal on which the signal processing is performed by the signal processing unit 8. Then, the detection unit 62 detects the object in a remote place from the above Equations (1) and (2) by using the corrected beat signal. Therefore, the radar 1 can detect the object in a remote place with an improved accuracy.

In addition, since the detection unit 62 stores the relative phase error value obtained through the test on the object at a relatively near position during a manufacturing procedure, the beat signal is corrected using the relative phase error value, so that the object can be detected with accuracy.

Further, the calculation unit 63 uses, for example, during the running of the vehicle 100, periods when the radar 1 turns on/off the transmission/reception of the signal, and can calculate the relative phase error value at a timing of turning off the transmission/reception of the signal. In addition, the error calculation timing may be a timing when the usage of the memory in the CPU is equal to or less than a threshold. The calculation unit 63 can suppress the increase of a processing load of the CPU by calculating the relative phase error value at these timings.

In addition, for example, the calculation unit 63 may calculate the relative phase error value at a timing when the vehicle 100 reaches a certain speed. Therefore, for example, the calculation unit 63 can calculate the relative phase error value in a case where the vehicle 100 reaches a speed at which the vehicle goes slow and there is no need to detect the object in front of the vehicle 100.

In addition, for example, the calculation unit 63 can calculate the relative phase error value at a timing when an operating time of the radar 1 exceeds a threshold or a timing when an ambient temperature of the radar 1 exceeds a threshold. Therefore, the calculation unit 63 can calculate the relative phase error value in a case where there occurs a change when time goes on or a change in the characteristics of the signal processing unit 8 due to a change of the ambient temperature.

Figure 3:
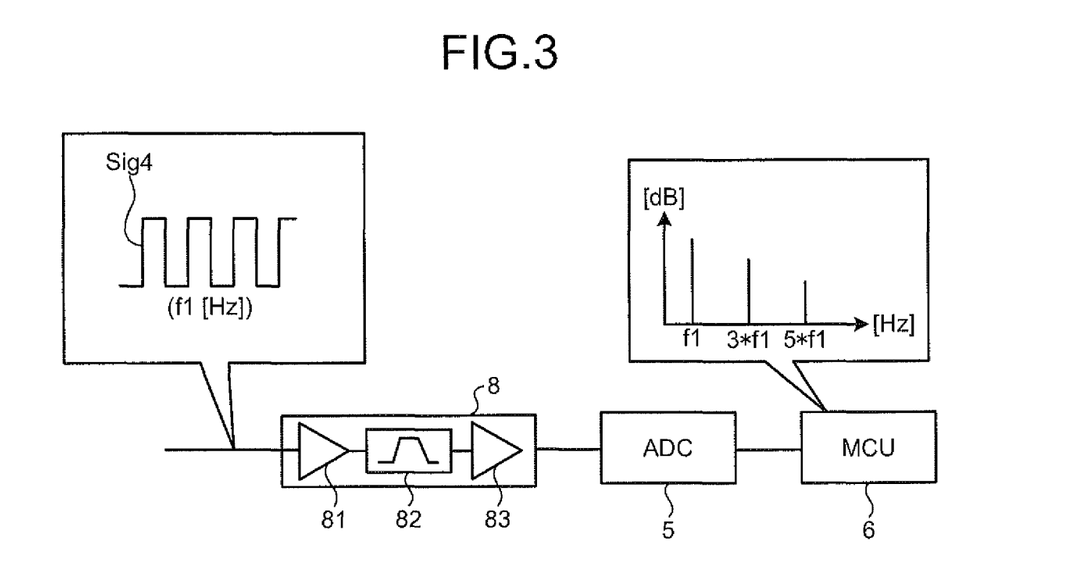
FIG. 3 is a diagram for describing a case where a pseudo signal generating unit according to the embodiment generates a rectangular pseudo signal.

Further, in the example illustrated in FIG. 2, the description has been made about a case where the pseudo signal Sig1 is a sinusoidal wave, but the pseudo signal generating unit 42 may generate a rectangular pseudo signal. Next, with reference to FIG. 3, the description will be made about a case where the pseudo signal generating unit 42 generates the rectangular pseudo signal. FIG. 3 is a diagram for describing a case where the pseudo signal generating unit 42 according to the embodiment generates the rectangular pseudo signal.

As illustrated in FIG. 3, in a case where a rectangular pseudo signal Sig4 is generated, the pseudo signal generating unit 42 inputs the generated pseudo signal Sig4 to the signal processing unit 8. The signal processing unit 8 performs a predetermined signal processing on the pseudo signal Sig4, and outputs the pseudo signal Sig4 after the signal processing to the ADC 5. The ADC 5 performs the AD conversion on the pseudo signal Sig4 and outputs the converted signal to the MCU 6.

The MCU 6 performs the FFT on the rectangular pseudo signal converted into the digital signal, and can acquire a signal in the frequency domain in which peaks appear at multiplications of the frequency of the pseudo signal Sig4 as illustrated in FIG. 3.

Therefore, the radar 1 can acquire phase data corresponding to a plurality of types of frequencies through only one AD conversion by the ADC 5, so that the relative phase error values for a near distance and a remote distance can be calculated even when the test is not performed in the manufacturing procedure.

Figure 4:
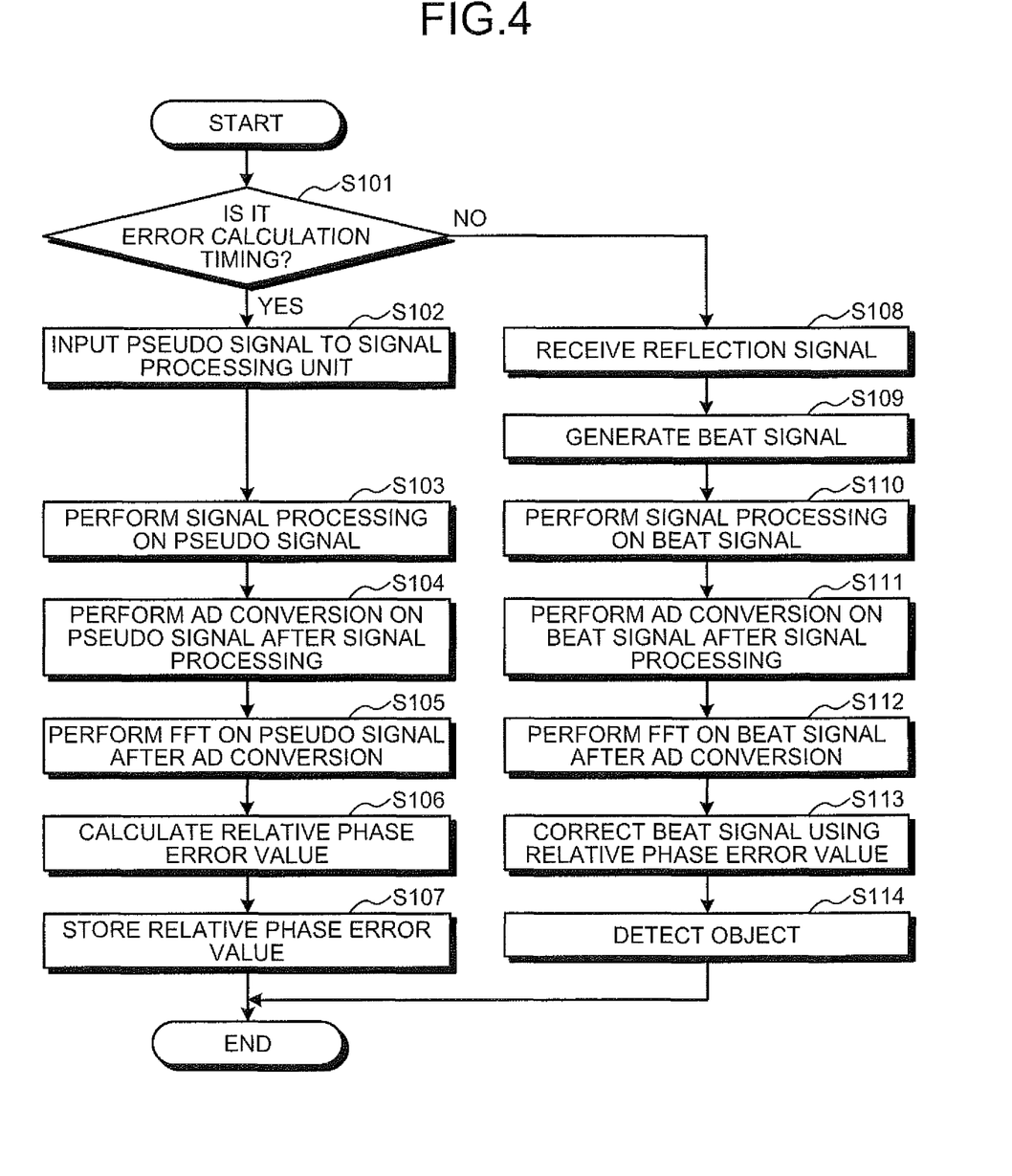
FIG. 4 is a flowchart illustrating a process performed in the radar according to the embodiment.

Next, the description will be made about a process performed in the radar 1 with reference to FIG. 4. FIG. 4 is a flowchart illustrating a process performed in the radar 1 according to the embodiment. Further, the radar 1 performs the process illustrated in FIG. 4 whenever the transmission signal is transmitted from the transmission unit 2.

As illustrated in FIG. 4, when the transmission signal is transmitted by the transmission unit 2, the MCU 6 determines whether it is a predetermined error calculation timing (Step S101). In a case where it is determined that it is the error calculation timing (Yes in Step S101), the MCU 6 turns off the first switch Sa and turns on the second switch Sb in order to make the pseudo signal input from the pseudo signal generating unit 42 to each signal processing unit 8 (Step S102).

When the pseudo signal is input, the signal processing unit 8 performs a predetermined signal processing on the pseudo signal (Step S103), and outputs the pseudo signal after the signal processing to the ADC 5. The ADC 5 performs the AD conversion on the input pseudo signal after the signal processing (Step S104), and outputs the AD-converted signal to the MCU 6.

The MCU 6 performs the FFT on the AD-converted pseudo signal (Step S105), and calculates the relative phase error value between the pseudo signals based on the FFT-converted pseudo signal (Step S106). Then, the MCU 6 stores the calculated relative phase error value (Step S107), and ends the process.

In addition, in a case where it is determined that it is not the error calculation timing (No in Step S101), the MCU 6 makes the reception unit 3 receive the reflection signal (Step S108) and mix the reflection signal and the transmission signal to generate the beat signal (Step S109). Then, the MCU 6 turns on the first switch Sa, and turns off the second switch Sb. Therefore, the beat signal is input from the reception unit 3 to the signal processing unit 8.

The signal processing unit 8 performs a predetermined signal processing on the input beat signal (Step S110), and outputs the beat signal after the signal processing to the ADC 5. The ADC 5 performs the AD conversion on the beat signal after the signal processing (Step S111), and outputs the AD-converted beat signal to the MCU 6.

The MCU 6 performs the FFT on the AD-converted beat signal (Step S112), and corrects the beat signal using the relative phase error value stored in Step S107 or the relative phase error value stored in the manufacturing procedure as the correction value (Step S113). Then, the MCU 6 detects the object based on the corrected beat signal (Step S114), and ends the process.

As described above, the radar 1 according to the embodiment includes the plurality of signal processing units 8 which are provided in the plurality of reception antennas 71 to 7n receiving the reflection signals of the transmission signal reflected on the object, and perform the signal processing in parallel on the beat signals based on the transmission signal and the reflection signals. Further, the radar 1 includes the pseudo signal generating unit 42 which generates the pseudo signal imitating the beat signal and inputs the pseudo signal as a target of the signal processing into the plurality of signal processing units 8 in parallel.

With this configuration, the radar 1 can reproduce a situation where the object at a remote place of about 100 m is detected, by making the pseudo signal generating unit 42 generate the pseudo signal of several MHz order. Therefore, according to the radar 1, it is possible to improve the detection accuracy of an object at a remote place by calculating the relative phase error value between the pseudo signals through the signal processing in the reproduced situation, correcting the beat signal based on the calculation result, and detecting the object based on the corrected beat signal.

In addition, in the radar 1, since the pseudo signal generating unit 42 may input the pseudo signal in the front stage of the beat signal generating unit 32 of the reception unit 3, but the pseudo signal is input in the rear stage of the beat signal generating unit 32, the pseudo signal generating unit 42 can be realized by a relatively simple configuration.

Specifically, for example, in a case where the pseudo signal is input in the front stage of the beat signal generating unit 32, the pseudo signal generating unit 42 inserts a frequency component generated in the reflection of the transmission signal on the object into the pseudo signal of several GHz order in order to reproduce a situation where an object at a remote place of about 100 m is detected.

On the contrary, when the pseudo signal is input to the rear stage of the beat signal generating unit 32, only the pseudo signal of about several MHz order may be generated, so that the pseudo signal generating unit 42 is realized by a simple configuration.

Figure 5:
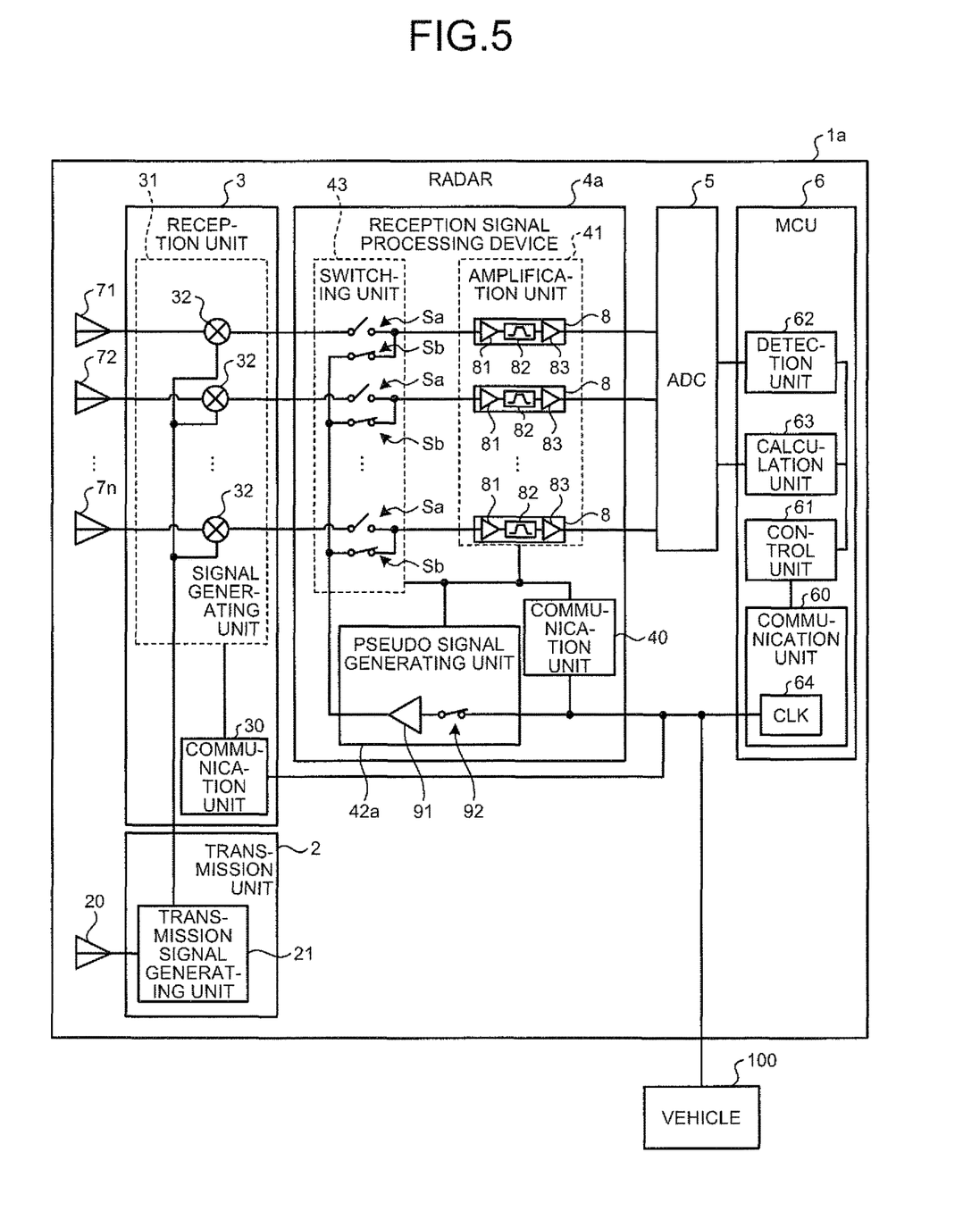
FIG. 5 is a diagram for describing a radar according to a first modification of the embodiment.
Figure 6:
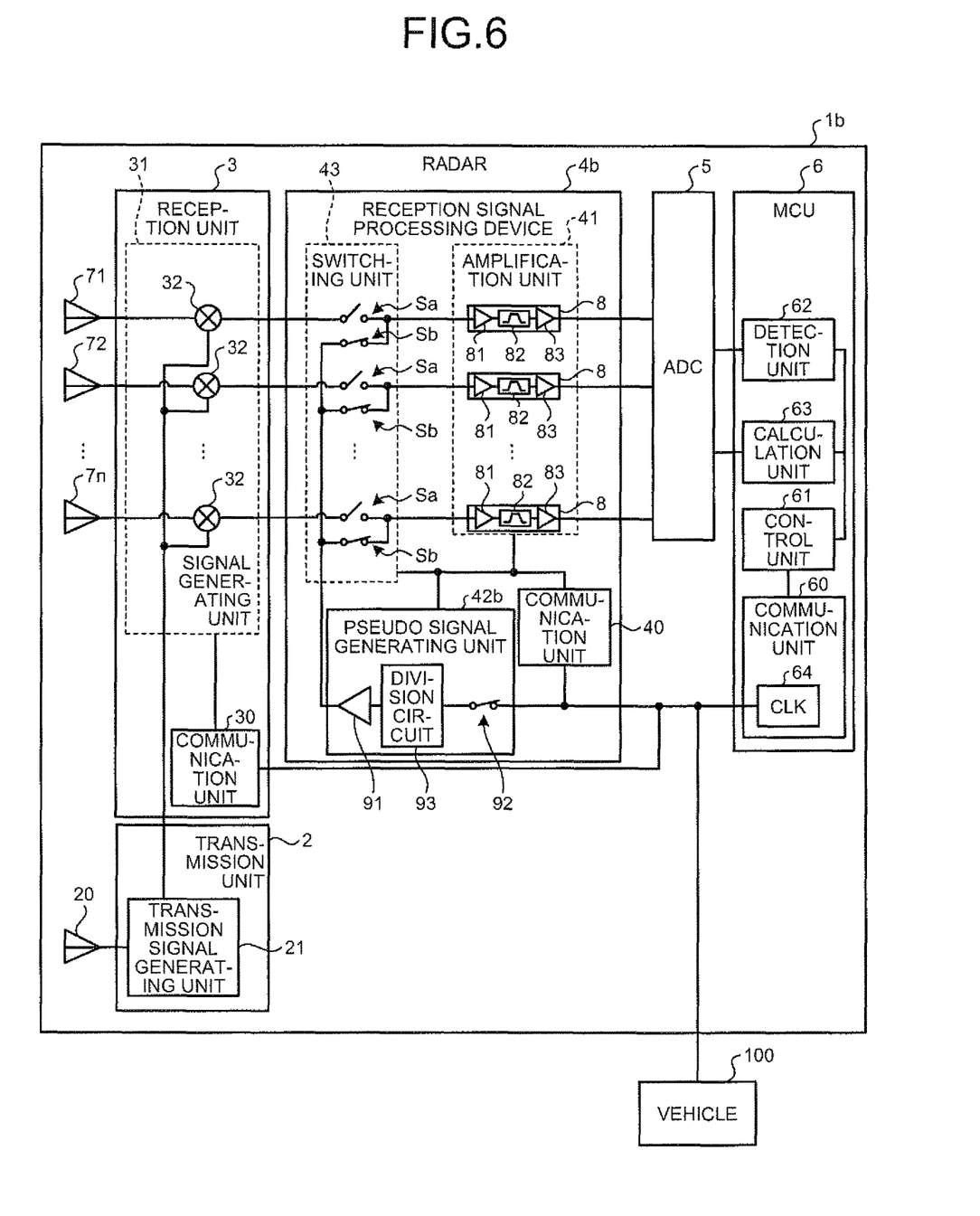
FIG. 6 is a diagram for describing a radar according to a second modification of the embodiment.
Figure 7:
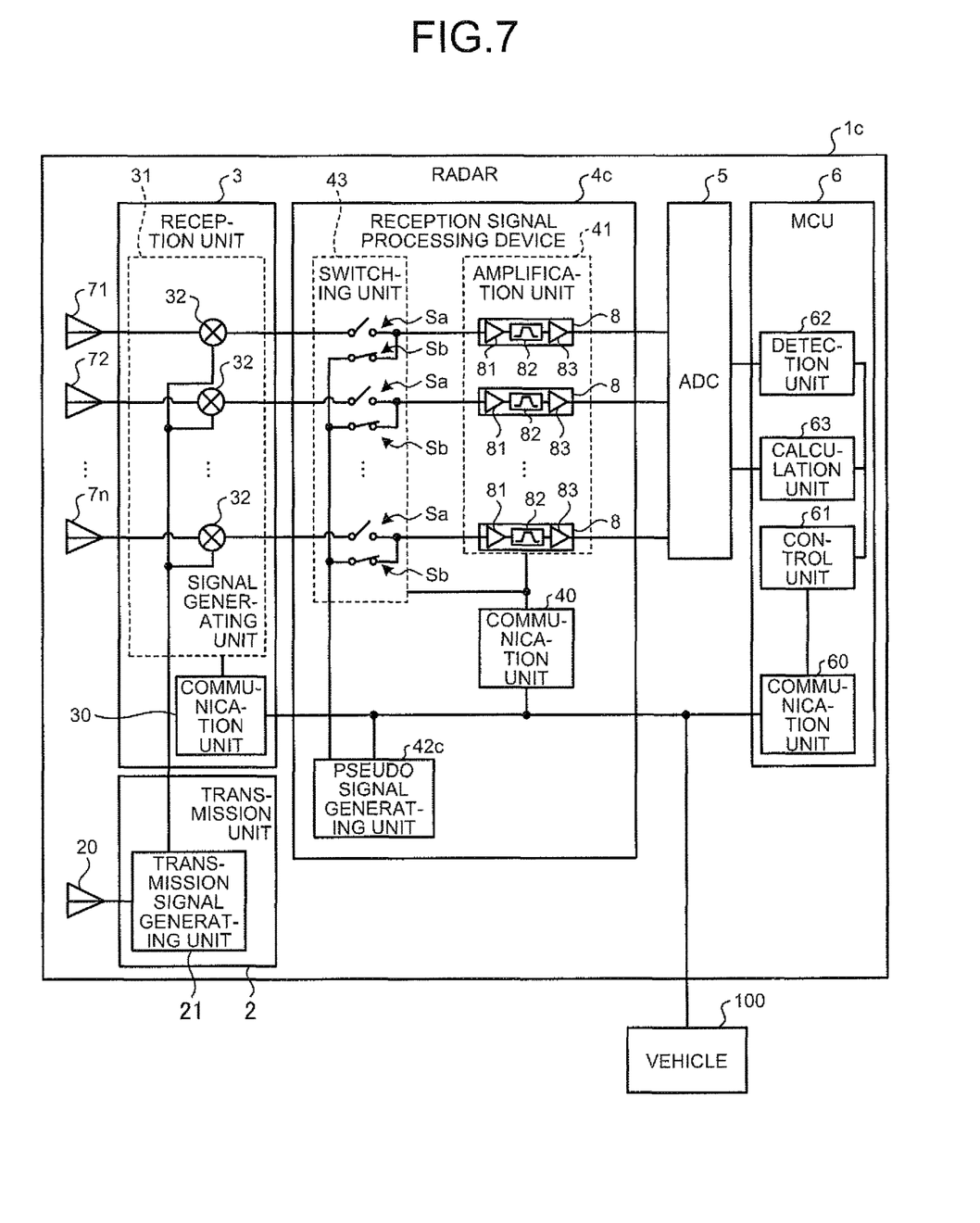
FIG. 7 is a diagram for describing a radar according to a third modification of the embodiment.

Further, the above-mentioned radar 1 is a mere example, and various modifications can be made. Hereinafter, radars according to modifications will be described with reference to FIGS. 5 to 9. FIG. 5 is a diagram for describing a radar 1a according to a first modification of the embodiment, FIG. 6 is a diagram for describing a radar 1b according to a second modification of the embodiment, and FIG. 7 is a diagram for describing a radar 1c according to a third modification of the embodiment.

Figure 8:
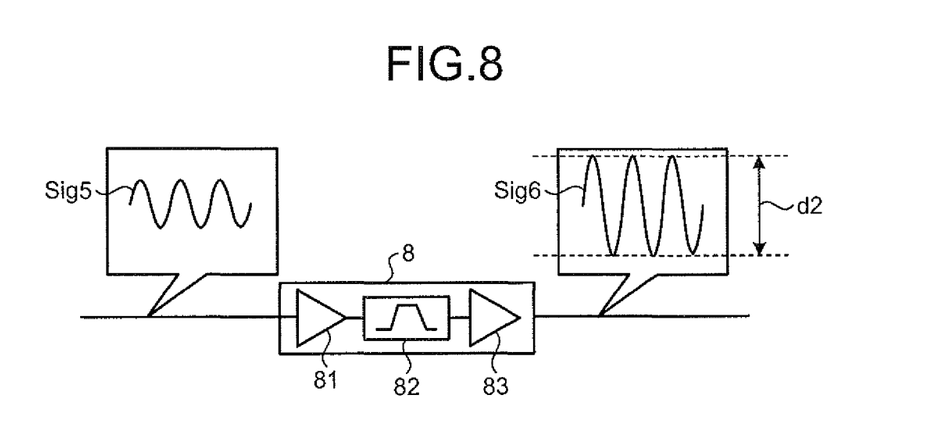
FIG. 8 is a diagram for describing an operation of the radar according to the third modification.
Figure 9:
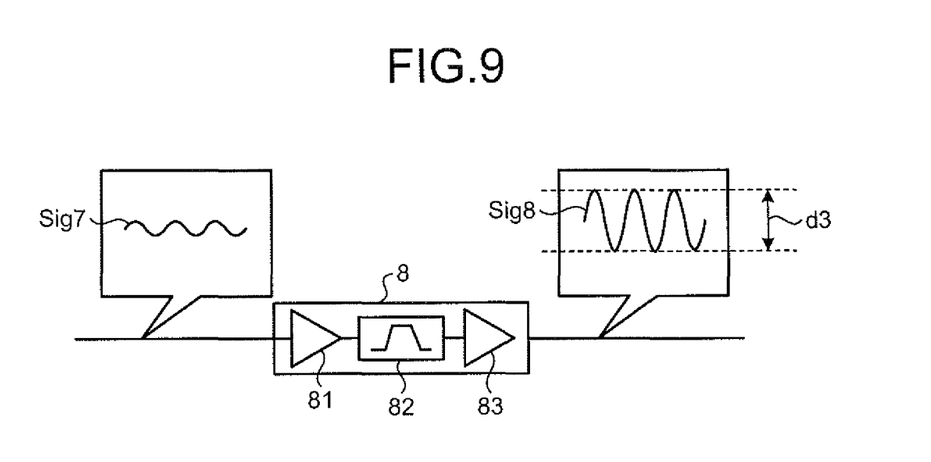
FIG. 9 is a diagram for describing an operation of the radar according to the third modification.

In addition, FIGS. 8 and 9 are diagrams for describing the radar 1c according to the third modification. Further, in the following, the same components as those of the radar 1 illustrated in FIG. 1 will be denoted with the same reference numerals as those of FIG. 1, and the descriptions thereof will not be repeated.

In FIG. 1, while not illustrated in the drawing, the communication unit 60 of the MCU 6 includes a clock (hereinafter, referred to as "CLK 64") for the communication as illustrated in FIG. 5. Then, the radar 1a according to the first modification illustrated in FIG. 5 is different from the radar 1 illustrated in FIG. 1 in that a clock signal generated by the CLK 64 is input to a pseudo signal generating unit 42a.

In the radar 1a, the pseudo signal generating unit 42a generates the pseudo signal using the clock signal for the communication as an original signal, and inputs the generated pseudo signal to the signal processing unit 8. In this way, the pseudo signal generating unit 42a generates the pseudo signal using the exciting clock signal used in the radar 1a, so that the pseudo signal can be generated by a simpler configuration.

In addition, the clock signal is a rectangular wave. Therefore, the pseudo signal generating unit 42a can generate the rectangular pseudo signal Sig4 as illustrated in FIG. 3. Thus, according to the radar 1a, the calculation unit 63 can acquire the phase data corresponding to a plurality of types of frequencies only by one AD conversion, so that the relative phase error values for a near distance and a remote distance can be calculated even when the test is not performed in the manufacturing procedure.

In addition, the pseudo signal generating unit 42a includes an amplifier 91 which amplifies the clock signal. For example, the amplifier 91 generates the pseudo signal having an amplitude not saturated in each channel by changing a constant voltage such as a reference bias voltage for the filter 82 included in a reception signal processing device 4a. Therefore, even in a case where the amplitude of the clock signal is minute, the pseudo signal generating unit 42a can generate the pseudo signal having an amplitude suitable for the calculation of the relative phase error.

In addition, the pseudo signal generating unit 42a includes a switch 92 which switches the connection and the disconnection between the CLK 64 and the amplifier 91. The pseudo signal generating unit 42a can change the frequency of the clock signal by changing a period for turning on and off the switch 92 based on a control signal input from the control unit 61. Therefore, the pseudo signal generating unit 42a can generate a plurality of types of the pseudo signals.

Next, as illustrated in FIG. 6, the radar 1b according to the second modification is different from the radar 1a illustrated in FIG. 5 in that a division circuit 93 is provided between the amplifier 91 and the switch 92 included in a pseudo signal generating unit 42b of a reception signal processing device 4b.

With this configuration, even in a case where the frequency of the clock signal is quite high, the pseudo signal generating unit 42b can generate a pseudo signal having a frequency lower than that of the clock signal by dividing the clock signal using the division circuit 93 so as to change the frequency.

Further, in a case where a phase locked loop (PLL) circuit is provided instead of the division circuit 93, the pseudo signal generating unit 42b can generate the pseudo signal having a frequency higher than that of the clock signal.

Next, as illustrated in FIG. 7, the radar 1c according to the third modification is different from the radar 1 illustrated in FIG. 1 in that a pseudo signal generating unit 42c of a reception signal processing device 4c is connected to the control unit 61. In the radar 1c, the pseudo signal generating unit 42c is controlled according to the control signal input from the control unit 61, and adjusts an amplitude of the pseudo signal which is generated according to the gain of the signal processing unit 8.

For example, as illustrated in FIG. 8, in a case where the gain of the variable gain amplifier 81 is large and an output voltage range d2 of the signal processing unit 8 is relatively wide, the pseudo signal generating unit 42c generates a pseudo signal Sig5 of which the amplitude is increased in order to make a signal Sig6 falling in the output voltage range d2 output from the signal processing unit 8.

On the other hand, as illustrated in FIG. 9, in a case where the gain of the variable gain amplifier 81 is small and an output voltage range d3 of the signal processing unit 8 is relatively narrow, the pseudo signal generating unit 42c generates a pseudo signal Sig7 of which the amplitude is reduced in order to make a signal Sig8 falling in the output voltage range d3 output from the signal processing unit 8. With this configuration, the radar 1c can prevent that the signal processed in each channel is saturated.

Further, the radars 1, 1a, 1b, and is according to the embodiment may further include a configuration which inputs the pseudo signal to the signal processing unit 8 and calculates a relative amplitude error value between the pseudo signals. In the case of such a configuration, the radars 1, 1a, 1b, and 1c correct the amplitude of the beat signal using the relative amplitude error value between the pseudo signals acquired by the calculation, and detect the object based on the beat signal corrected in the phase and the amplitude. Therefore, the radars 1, 1a, 1b, and 1c can more improve the detection accuracy of the object.

In addition, in a case where a configuration of calculating the relative amplitude error value between the pseudo signals is provided, the radars 1, 1a, 1b, and 1c may correct the amplitude of the beat signal subjected to the signal processing, or may correct the gain of the variable gain amplifier 81.

In the case of such a configuration, the variable gain amplifier 81 corrects the gain according to the relative amplitude error value between the pseudo signals which are subjected to the signal processing by the plurality of signal processing units 8. Therefore, since each variable gain amplifier 81 can output the beat signal having the uniform amplitude, the radars 1, 1a, 1b, and 1c can more improve the detection accuracy of the object.

In addition, in this embodiment, the description has been made about an example in which the pseudo signal is the rectangular wave or the sinusoidal wave, but the pseudo signal generating units 42, 42a, 42b, and 42c may be configured to generate any one of a rectangular wave, a triangular wave, a sawtooth wave, and a sinusoidal wave.

Further, in a case where the pseudo signal generating units 42, 42a, 42b, and 42c generate the pseudo signals of the triangular wave, the sawtooth wave, the sinusoidal wave using the clock signal as an original signal, the pseudo signal is generated by processing the waveform of the clock signal.

According to an aspect of embodiment, it is possible to provide a reception signal processing device, a radar, and an object detection method which can improve the detection accuracy of the object in a remote place.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A reception signal processing device comprising:
   a plurality of signal processing units provided so as to correspond to respective reception antennas receiving reflection signals of a transmission signal reflected on an object, and that perform signal processing in parallel on beat signals based on the transmission signal and the reflection signals; and
   a pseudo signal generating unit that generates a pseudo signal imitating a frequency of the beat signal, and inputs the pseudo signal as a target of the signal processing into the plurality of signal processing units in parallel, wherein
   the pseudo signal generating unit is configured to:
   include any one of a division circuit, a Phase Locked Loop (PLL) circuit, and a switch, each of which changes a frequency of a dock signal for communication, the switch changing the frequency of the clock signal based on a change in a period for turning on and off of the switch, and
   generate a plurality of pseudo signals having different frequencies by using the clock signal as a source signal.

2. The reception signal processing device according to claim 1,
   wherein the pseudo signal generating unit generates the pseudo signal of any one of a rectangular wave, a triangular wave, a sawtooth wave, and a sinusoidal wave.

3. The reception signal processing device according to claim 1,
   wherein the signal processing unit includes a variable gain amplifier which amplifies an input signal, and
   wherein the pseudo signal generating unit adjusts the pseudo signal according to a gain of the variable gain amplifier so as not to make the variable gain amplifier saturated in amplitude.

4. The reception signal processing device according to claim 3,
   wherein the variable gain amplifier corrects a gain according to a relative amplitude error value between the pseudo signals which are subjected to the signal processing by the plurality of signal processing units.

5. A radar comprising:
   a plurality of beat signal generating units so as to correspond to respective reception antennas receiving reflection signals of a transmission signal reflected on an object, and that generate beat signals in parallel based on the transmission signal and the reflection signals received by the reception antennas;
   a plurality of signal processing units provided so as to correspond to respective reception antennas, and that perform signal processing in parallel on the beat signals;
   a pseudo signal generating unit that generates a pseudo signal imitating a frequency of the beat signal, and outputs the pseudo signal as a target of the signal processing in parallel to the plurality of signal processing units; and
   a calculation unit that calculates a relative phase error value between the pseudo signals which are subjected to the signal processing by the plurality of signal processing units, wherein
   the pseudo signal is configured to
   include any one of a division circuit, a Phase Locked Loop (PLL) circuit, and switch, each of which changes a frequency of a dock signal for communication, the switch changing the frequency of the clock signal based on a change in a period for turning on and off of the switch; and
   generate a plurality of pseudo signals having different frequencies by using the clock signal as a source signal, and
   the calculation unit calculates the relative phase error value between the pseudo signals that are subjected to the signal processing by the plurality of signal processing units, the pseudo signals including the plurality of types of pseudo signals having different frequencies.

6. The radar according to claim 5,
   wherein the pseudo signal generating unit generates the pseudo signal of any one of a rectangular wave, a triangular wave, a sawtooth wave, and a sinusoidal wave.

7. The radar according to claim 5,
   wherein the signal processing unit includes a variable gain amplifier which amplifies an input signal, and
   wherein the pseudo signal generating unit adjusts the pseudo signal according to a gain of the variable gain amplifier so as not to make the variable gain amplifier saturated in amplitude.

8. The radar according to claim 7,
   wherein the calculation unit calculates a relative amplitude error value between the pseudo signals which are subjected to the signal processing by the plurality of signal processing units, and
   wherein the variable gain amplifier corrects a gain according to the relative amplitude error value.

9. The radar according to claim 5,
   wherein the calculation unit calculates the relative phase error value during the running of a vehicle on which the radar is mounted.

10. An object detection method comprising:
    receiving reflection signals of a transmission signal reflected on an object through a plurality of reception antennas;
    generating a plurality of beat signals by mixing the reflection signals received by the plurality of reception antennas and the transmission signal;
    generating a pseudo signal imitating a frequency of the beat signal by using any one of a division circuit, a Phase Locked Loop (PLL) circuit, and a switch, each of which changes a frequency of a clock signal for communication, the switch changing the frequency of the dock signal based on a change in a period for turning on and off of the switch, and inputting the pseudo signal as a target of signal processing into a plurality of signal processing units which perform the signal processing on each of the plurality of beat signals in parallel;
    calculating a relative phase error value between pseudo signals which are subjected to the signal processing by the plurality of signal processing units; and using the calculated relative phase error value as a correction value of the beat signals which are subjected to the signal processing by the plurality of signal processing units, and detecting the object based on the corrected beat signals, wherein the generating includes generating a plurality of pseudo signals having different frequencies by using the clock signal as a source signal, and the calculating includes calculating the relative phase error value between the pseudo signals that are subjected to the signal processing by the plurality of signal processing units, the pseudo signals including the plurality of pseudo signals having different frequencies.

11. The reception signal processing device according to claim 1, wherein the pseudo signal generating unit includes an amplifier that amplifies the clock signal, and generates the pseudo signal having an amplitude not saturated in a signal system of each of the reception antennas.

12. The radar according to claim 5, wherein the pseudo signal generating unit generates a rectangular wave including harmonics having a plurality of frequencies, and wherein the calculation unit calculates the relative phase error value between the pseudo signals which are subjected to the signal processing by the plurality of signal processing units, the pseudo signals including the harmonics having the plurality of frequencies.

13. The radar according to claim 12, further comprising a detection unit that uses the relative phase error value calculated by the calculation unit as a correction value of the beat signals that are subjected to the signal processing by the plurality of signal processing units, and detects the object based on the corrected beat signals.

14. The radar according to claim 5, wherein the pseudo signal generating unit includes an amplifier that amplifies the clock signal, and generates the pseudo signal having an amplitude not saturated in a signal system of each of the reception antennas.

* * * * *